Figure 1:
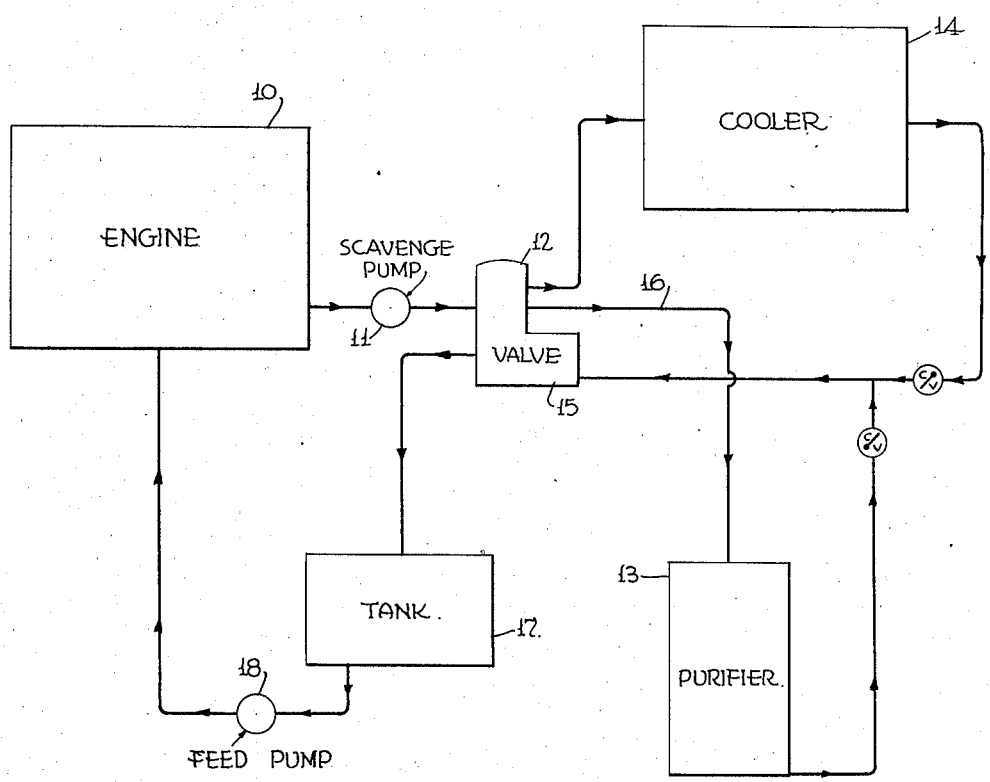

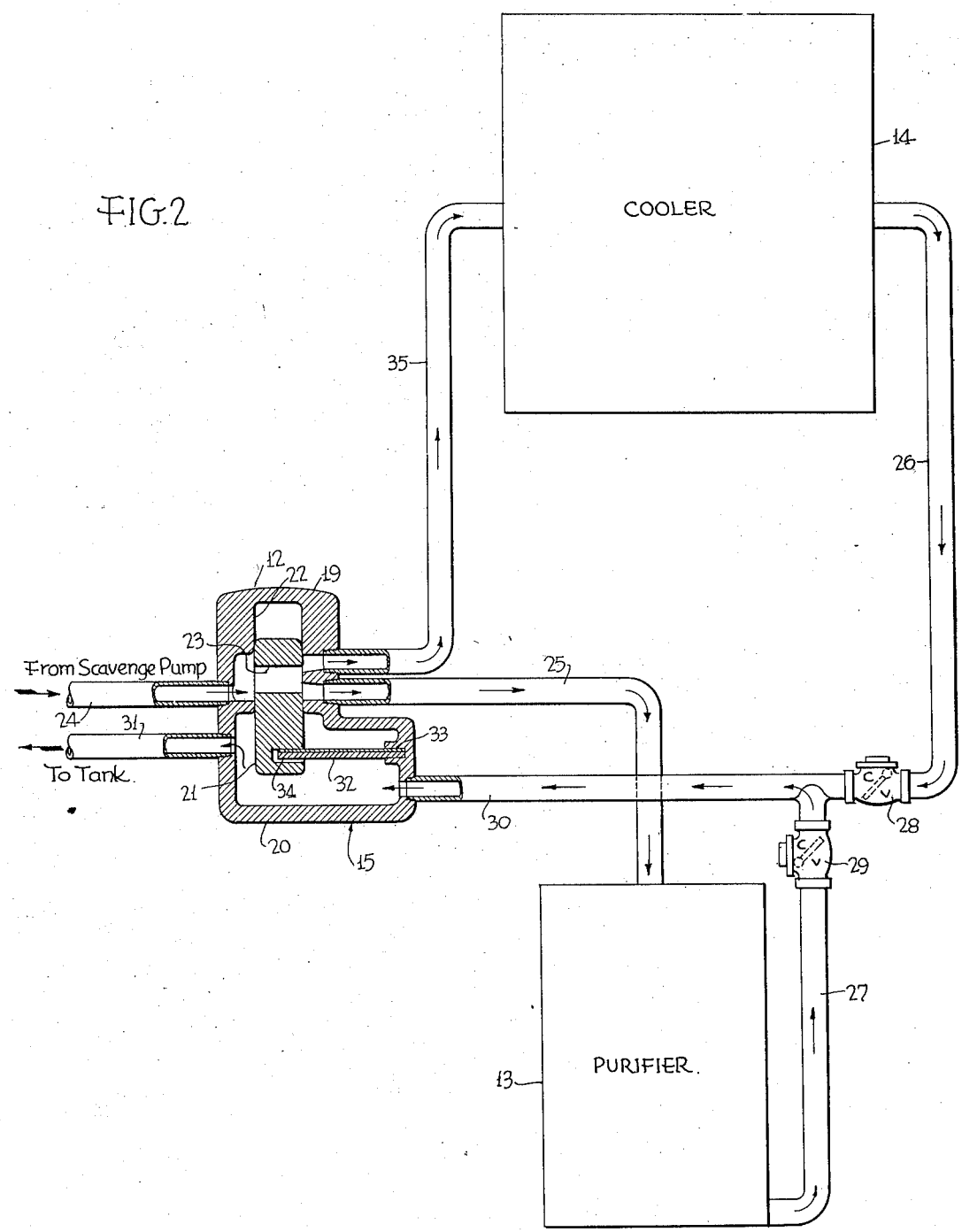

Patented Nov. 20, 1945

2,389,555

UNITED STATES PATENT OFFICE 2,389,555

PURIFYING AND COOLING SYSTEM FOR LUBRICATING OILS

Laurence Price Sharples, Ardmore, Pa., assignor to The Sharples Corporation, Philadelphia, Pa., a corporation of Delaware Application September 17, 1942, Serial No. 458,623

4 Claims. (Cl. 210—62)

The present invention pertains to the purification of liquids. It is concerned particularly with the cooling and purification of oil used to lubricate a vehicle engine, such as an aircraft engine. The detailed features of the invention will be discussed in their relation to the purification and cooling of aviation engine oil after use in an airplane engine, as treating steps applied to that oil prior to return thereof to the engine for re-use.

The lubricating system of an airplane engine may comprise an oil storage tank, a conduit from the storage tank to the feed pump on or in the engine for pumping oil to the various parts of the engine to lubricate it, a sump in the engine into which the oil drains from the various parts of the engine, a scavenge pump which pumps oil and some air from the sump, a conduit from the scavenge pump to an oil cooler, and a conduit from the oil cooler to the oil storage tank.

In addition, it is desirable that the oil be subjected to treatment in a purifier, such as a centrifugal or filter, capable of removing impurities accumulated by the oil during use. Sludge, abrasives, water, and air are among the impurities with which the oil becomes contaminated.

A purifier may be mounted in series with the oil cooler in the line between the scavenge pump and the oil storage tank. While there are considerable theoretical advantages in a system in which the oil purifier is mounted in the line of flow from the scavenge pump, previously proposed systems in which the purifier is mounted in series with the cooler are subject to the objection that the flow resistance in the system leading from the scavenge pump is thereby increased. This disadvantage is especially pronounced at high altitudes, as difficulty is sometimes encountered in the performance of the scavenging function at such altitudes even in systems which do not include an oil purifier as an additional element of flow resistance.

The present invention provides a system and method for effecting cooling and purification of lubricating oil by which the oil is passed through the purifier under the impelling force of the scavenge pump without causing the disadvantage of undesirable load upon the scavenge pump involved in prior art proposals for using the scavenge pump to effect this feed. This advantage is attained by mounting the oil purifier in parallel with the cooler and providing a valve which is automatically or manually controlled to cause oil to flow through the oil purifier only at such times and in such proportions as are consistent with the full effectiveness of the cooler in keeping the oil below a certain maximum temperature.

Further detailed features of the invention will be evident from a reading of the following detailed description in the light of the attached drawings, in which, Figure 1 is a flow sheet illustrating a preferred embodiment of the invention, and Figure 2 is a partially diagrammatic cross section illustrating a valve and thermostatic control which may be used with the invention.

Referring to Figure 1 of the drawings by reference characters, oil from the engine 10 is removed from the sump of that engine by a scavenge pump 11 in conventional manner. The resulting mixture of oil, air and such solid or liquid impurities as may be present is passed through a valve 12, whose operation is controlled by the thermostat 15. The cooler 14 is mounted in a direct line between the valve 12 and thermostatic control 15, and an oil purifier 13, which may be a centrifugal, a filter, or other type of purifier, is mounted in a by-pass line 16.

So long as the oil contacting the temperature-responsive element of the thermostatic control 15 is below a certain maximum permissible temperature, that control will operate to cause the valve 12 to be actuated to a position in which oil will be caused to flow through the by-pass line including the oil purifier 13. When the oil reaches a higher temperature as it passes through the thermostatic control 15, however, the valve 12 will be actuated to cause part or all of the oil to flow through the cooler 14, and to shut off, partially or completely, access of oil from the valve 12 to the by-pass line 16 including the oil purifier 13. It will thus be seen that the additional pressure load on the scavenge pump 11 which would be caused by mounting the cooler and oil purifier in series is avoided, and that the valve 12 operates to cause sufficient oil to flow through cooler 14 to effect adequate cooling whenever cooling is necessary.

Oil passing through the thermostatic control element 15 is passed to the oil storage tank 17, as illustrated, and may then be returned from that tank to the motor 10 by the conventional oil feed pump 18.

Figure 2 of the drawings illustrates the valve 12 and thermostatic control 15 and related connections. The valve housing as illustrated consists of an upper portion 19 through which the oil flows in passing from the scavenge pump to the cooler 14 or purifier 13 and a lower portion 20 through which it flows in returning to the tank 17. A balanced valve 21 is mounted for reciprocatory movement in a mating groove 22 of the housing and is provided with a transverse passage 23 for bringing the inlet passage 24 into communication with conduit 25 leading to purifier 13 or conduit 35 leading to cooler 14, respectively, depending upon the position of the valve. In returning from the cooler 14 and/or purifier 13 through conduit 26 and check valve 28 and/or conduit and check valve 27 and 29, and through conduits 30 and 31 to tank 17, the oil passes through the lower portion 20 of the valve housing. A thermostatic element 32 is secured in this housing as indicated at 33, and this element is in turn secured at 34 to the lower end of the valve 21.

In operation, when the oil is relatively cold, the valve will be depressed to establish communication between conduits 24 and 25. As the oil becomes warmer, oil returning from purifier 13 will act upon the thermostatic element 32 to raise the valve 21 and cause part of the oil to be passed through conduit 35 and cooler 14, while the remainder passes through purifier 13. If the oil becomes still warmer, the valve will be raised to a position cutting off communication between conduits 24 and 25 and establishing full flow of oil through the cooler 14.

Various modifications are possible within the scope of the invention, and I do not therefore wish to be limited except by the scope of the following claims. The cooling and purifying system above described may for instance be used on the liquid coolant for an engine or on an oil system of a mountain tram-car. The oil may be sucked through the cooler and purifier rather than forced through by a pressure pump.

I claim:

1. In a fluid purification and cooling system, the combination comprising a cooler, means for impelling fluid through said cooler, a fluid purifier connected in parallel with said cooler in the line of flow of the fluid from said impelling means, and means responsive to the temperature of fluid passing through said system for treatment for controlling the relative flow of fluid through said cooler and purifier, respectively, said means increasing the ratio of fluid passed through said cooler to fluid passed through said purifier upon increase in the temperature thereof, means for recombining the fluid passed through said purifier with the fluid passed through said cooler, and a receiving member for receiving the recombined fluid, said parallel arrangement being such that no liquid from either the purifier or the cooler passes through the other of these two members.

2. In a lubricant purification and cooling system, the combination comprising a cooler, means for impelling lubricant through said cooler, a lubricant purifier connected in parallel with said cooler in the line of flow of lubricant from said impelling means, and means responsive to the temperature of lubricant passing through said system for treatment for controlling the relative flow of lubricant through said cooler and purifier, respectively, said means increasing the ratio of lubricant passed through said cooler to lubricant passed through said purifier upon increase in the temperature thereof, means for recombining the lubricant passed through said purifier with the lubricant passed through said cooler and returning this recombined body of lubricant to the zone of lubricating use, and a receiving member for receiving the recombined lubricant, said parallel arrangement being such that no liquid from either the purifier or the cooler passes through the other of these two members.

3. In a lubricant purification and cooling system, the combination comprising a cooler, means for impelling lubricant through a conduit to said cooler and through said cooler, a lubricant purifier connected in parallel with said cooler in the line of flow of oil from said impelling means, said parallel arrangement being such that lubricant from either the purifier or the cooler does not pass through the other of these elements, a receiving member for receiving lubricant which has passed through said cooler or through said purifier, means for controlling the relative flow of lubricant through said cooler and purifier, respectively, and means responsive to the temperature of lubricant passing through said system for controlling said last-named means to cause increase of the ratio of lubricant passed through said cooler to lubricant passed through said purifier upon increase of the temperature of said lubricant.

4. In a lubricant purification and cooling system, the combination comprising a cooler, means for impelling lubricant through a conduit to said cooler and through said cooler, a lubricant purifier connected in parallel with said cooler in the line of flow of oil from said impelling means, said parallel arrangement being such that lubricant from either the purifier or the cooler does not pass through the other of these elements, a receiving member for receiving lubricant which has passed through said cooler or through said purifier, means for controlling the relative flow of lubricant through said cooler and purifier, respectively, and means responsive to the temperature of lubricant passing through said system for controlling said last-named means to cause discontinuance of flow of lubricant through said purifier and passage of the entire flow of lubricant through said cooler upon attainment of a predetermined temperature.

LAURENCE PRICE SHARPLES.